United States Patent [19]

Ikeda

[11] Patent Number: 5,363,947
[45] Date of Patent: Nov. 15, 1994

[54] SPRING FOR ONE-WAY CLUTCH HAVING ADJUSTING OPENINGS OF A SPECIAL SHAPE

[75] Inventor: Takaaki Ikeda, Nara, Japan

[73] Assignee: Koyo Seiko Co., Ltd., Osaka, Japan

[21] Appl. No.: 50,644

[22] Filed: Apr. 22, 1993

[30] Foreign Application Priority Data

Aug. 31, 1992 [JP] Japan .................. 4-060886[U]

[51] Int. Cl.$^5$ .................. F16D 41/06; F16F 1/18
[52] U.S. Cl. .................. 192/45.1; 192/41 R; 192/41 A; 267/163
[58] Field of Search ............ 192/45.1, 41 A, 41 R; 188/82.8; 267/163; 384/583, 580, 572

[56] References Cited

U.S. PATENT DOCUMENTS

| 1,765,648 | 6/1930 | Bott | 384/580 |
| 2,824,635 | 2/1958 | Troendly et al. | 192/45.1 |
| 4,347,920 | 9/1982 | Bordes | 192/45.1 X |
| 4,848,557 | 7/1989 | Uchida et al. | 192/45.1 X |
| 5,052,533 | 10/1991 | Carey et al. | 192/45.1 X |

Primary Examiner—Rodney H. Bonck
Attorney, Agent, or Firm—Wenderoth, Lind & Ponack

[57] ABSTRACT

A spring is assembled in an annular shape into a one-way clutch to urge engagement members disposed between inner and outer races of the one-way clutch in one direction. In the spring, first and second transverse sections are alternately provided. Those first and second transverse sections define receiving openings which have a generally rectangular shape adapted to receive the engagement members therein. Each first transverse section has a tab projecting into the respective receiving opening so as to press an engagement member received in the receiving opening. The first and second transverse sections also define adjusting openings which are provided alternately with the receiving openings for adjusting the widths of at least the first transverse sections. Each adjusting opening is of a generally rectangular shape and is provided with curved fillets protruding outwardly in a crosswise direction of the spring, so that the widths of the first transverse sections are prevented from becoming larger than those of the tabs even at their end portions.

5 Claims, 4 Drawing Sheets

SPRING FOR ONE-WAY CLUTCH HAVING ADJUSTING OPENINGS OF A SPECIAL SHAPE

BACKGROUND OF THE INVENTION

1. Field of the Invention

The present invention generally relates to a one-way clutch to allow the transmission of a rotating torque between inner and outer rings only in one direction and more particularly, to an annular spring for urging engagement members such as sprags disposed between the inner and outer rings in one direction.

2. Description of the Prior Art

FIG. 1A is a side view of a common one-way clutch and FIG. 1B is a cross-sectional view taken along line 1—1 of FIG. 1A. As shown in these figures, the one-way clutch generally has an inner ring 61 and an outer ring 62 (only its inner surface is shown) substantially concentric with the inner ring 61. Between the inner ring 61 and the outer ring 62, a plurality of sprags 63 are disposed spaced from each other at regular intervals to serve as engagement members for engaging the inner ring 61 with the outer ring 62. The sprags 63 are held in place by inner and outer retainers 65, 65 and are each urged in one direction by an annular spring 66 disposed radially between the inner and outer retainers 65. Thus, the one-way clutch transmits a rotating torque from the inner ring 61 to the outer ring 62 only when the inner ring 61 rotates in one direction relative to the outer ring 62.

FIGS. 2-4 are fragmentary plan views of various types of conventional springs for use as the annular spring 66 in the one-way clutch. The spring shown in FIG. 2 is of a basic type which is used when the sprags 63 are disposed at relatively small intervals. As shown in FIG. 2, the spring includes receiving openings 31 having a generally rectangular shape and provided at regular intervals for receiving the respective sprags 63. The receiving openings 31 are defined by transverse sections 33. Each transverse section 33 has a tab 32 projecting from its central portion into the respective receiving opening 31. The tab 32 contacts the sprag 63 placed in the receiving opening 31 in a pressing manner when the spring is assembled in the one-way clutch. Each receiving opening 31 is provided with fillets 31a in its corners. The width w1 of the transverse section 33 is made not larger than that w2 of the tab 32 so that a force applied from the sprag 63 to the tab 32 is well absorbed by elastic torsional deformation of the transverse section 33 connected with the tab 32, that stress is not concentrated on the tab 32 and that the tab 32 is prevented from eventually breaking.

When the distance between adjoining receiving openings 31 (pitch of the receiving openings 31) is required to be too great, an adjusting opening 35 of an elliptic shape is provided between the adjoining receiving openings 31 as shown in FIG. 3 so that the transverse section 33 is provided with a width which is greater than or equal to the width w2 of the tab 32. Accordingly the size of the elliptic adjusting opening 35 increases as the pitch of the receiving openings 31 becomes larger.

However, as the width of the elliptic adjusting opening 35 increases, the transverse section 33 becomes widened at its opposite end portions 33a between a respective corner of the receiving opening 31 and a respective radius of the elliptic adjusting opening 35, resulting in the width of each of the end portions 33a becoming larger than that of the tab 32, as shown in FIG. 4. The end portions 33a wider than the tab 32 being makes it difficult for the transverse section 35 to be torsionally deformed. As a result, stress tends to be concentrated on the tab 32, which will eventually break.

SUMMARY OF THE INVENTION

The object of the present invention is therefore to provide a spring for a one-way clutch which is not subjected to stress concentration on its tabs no matter how large the size of the adjusting opening for adjusting the width of the transverse section is.

In order to achieve the above object, according to an aspect of the present invention, a spring, which is assembled in an annular shape into a one-way clutch to urge engagement members disposed between inner and outer races of the one-way clutch in one direction, comprises:

a) first and second transverse sections alternately provided;

b) receiving openings defined by the first and second transverse sections and having a generally rectangular shape adapted to receive the engagement members therein;

c) tabs adapted to urge the engagement members in the one direction, the tabs being integral with the first transverse sections and projecting into respective ones of the receiving openings; and d) adjusting openings defined by the first and second transverse sections and provided alternately with the receiving openings for adjusting widths of at least the first transverse sections, wherein each adjusting opening is of a generally rectangular shape and is provided with curved fillets protruding outwardly in a crosswise direction of the spring.

According to the present invention, due to the curved fillets of each adjusting opening shaped so as to protrude outwardly in the crosswise direction of the spring and to expand corners of the adjusting opening toward the end portions of the corresponding first transverse section, the end portions of the first transverse sections are prevented from being wider than the tabs, no matter how large the adjusting openings are. That is, the widths of the end portions are controlled to be equal to or even narrower than those of the tabs, irrespective of the size of the adjusting openings, unlike the prior art having elliptic adjusting openings 35 as shown in FIGS. 3 and 4. Accordingly, for any selected pitch of the receiving openings, stress exerted from the engagement members on the tabs can be well absorbed by the elastic torsional deformation of the transverse sections, so that the stress concentration on the tabs and the resulting breakage of the tabs are thereby prevented.

In addition, due to the shape of the curved fillets of each adjusting opening which protrude outward in the crosswise direction to the end portions of the transverse sections, the radius of curvature of the fillets is reduced, as compared with that of the corners of the elliptic openings 35 of the prior art spring shown in FIG. 4. Accordingly, less burr is generated at the time of punching the adjusting openings, as compared with the prior art spring.

Each receiving opening may also be provided with fillets which protrude outwardly in the crosswise direction of the spring. In this case, the end portions of the transverse section can be reduced in width from both the adjusting opening and the receiving opening to permit a greater adjustable range in width of the transverse section.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 5:
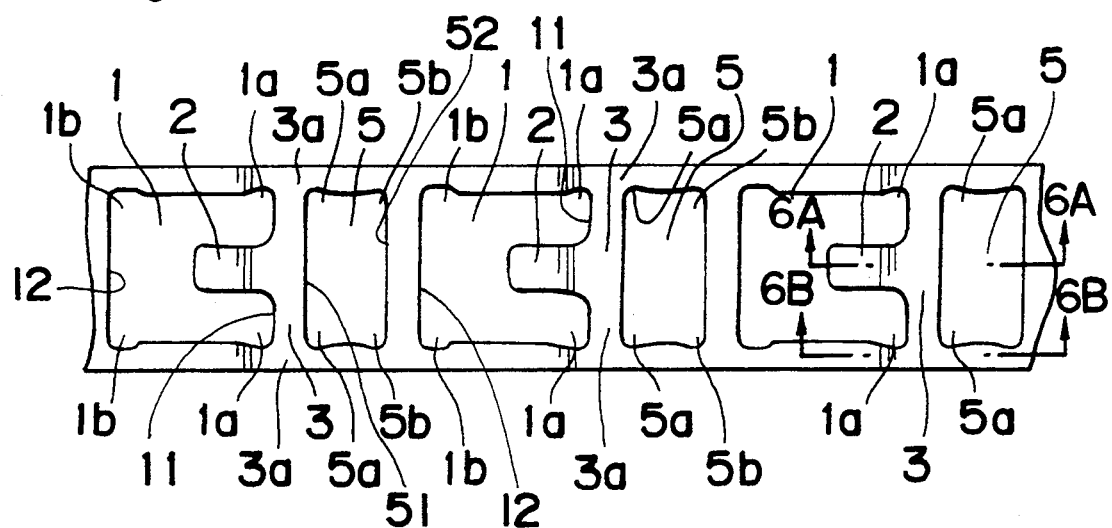
FIG. 5 is a fragmentary plan view of an annular spring of an embodiment of the present invention for use in a one-way clutch as shown in FIG. 1A.

FIG. 5 shows a part of a spring of an embodiment of the present invention for use in a one-way clutch as shown in FIGS. 1A and 1B, and FIGS. 7-11 shows variants of the spring of FIG. 5. The spring is made of an elastic sheet and is assembled in an annular shape into the one-way clutch to urge engagement members (indicated by 63 in FIGS. 1A and 1B) of the one-way clutch in one direction.

The spring includes a plurality of receiving openings 1, 1, . . . spaced from each other in a longitudinal direction. Each receiving opening 1 has a generally rectangular shape to be engaged with the respective engagement member. Each receiving opening 1 is provided with fillets 1a of a curved quasi-triangular shape at opposite ends on one side thereof and fillets 1b of a curved quasi-trapezoidal shape at opposite ends on the other side thereof so that edges 11 and 12 of the receiving openings 1 extends in a crosswise direction of the spring. That is, the fillets 1a and 1b protrude outwardly in the crosswise direction of the spring.

The spring further includes adjusting openings 5 of a generally rectangular shape between the adjoining receiving openings 1, so that the adjusting openings 5 alternate with the receiving openings 1. Between the receiving openings 1 and the adjusting openings 5 are disposed transverse sections 3. Every transverse section 3 has the same width. Tabs 2 project from the respective transverse sections (first transverse sections) 3 which are positioned on one side (the right-hand side, in FIG. 5) of the receiving openings 2. The tabs 2 are integral with those transverse sections 3. When the spring is assembled in an annular shape into a one-way clutch, the tabs 2 press the respective engagement members received in the receiving openings 1.

Figure 6A:
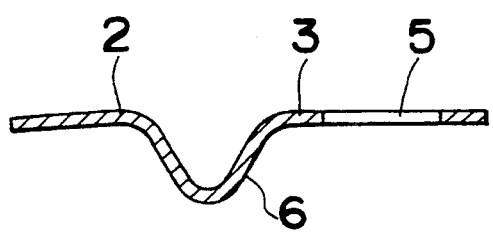
FIG. 6A is a cross sectional view taken along line 6A—6A of FIG. 5.
Figure 6B:
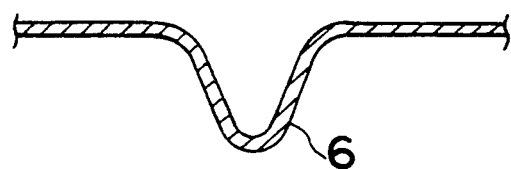
FIG. 6B is a cross sectional view taken along line 6B—6B of FIG. 5.

The spring has a transverse fold 6 at portions including a root portion of each tab 2 adjacent to the transverse section 3, as shown in FIGS. 6A and 6B.

The adjusting openings 5 function as allow the adjoining receiving openings 1 to be spaced apart by a required distance, while limiting the width of the transverse sections 3.

Each adjusting opening 5 is provided with fillets 5a of a curved quasi-triangular shape on one side thereof and fillets 5b of also a curved quasi-triangular shape on the other side thereof so that edges 51 and 52 of the adjusting opening 5 are elongated in the crosswise direction of the spring. That is, the fillets 5a and 5b protrude outwardly in the crosswise direction of the spring. In other words, the corners of each adjusting opening 5 are expanded toward end portions 3a of the transverse sections 3 disposed on both sides of the adjusting opening 5.

Figure 1B:
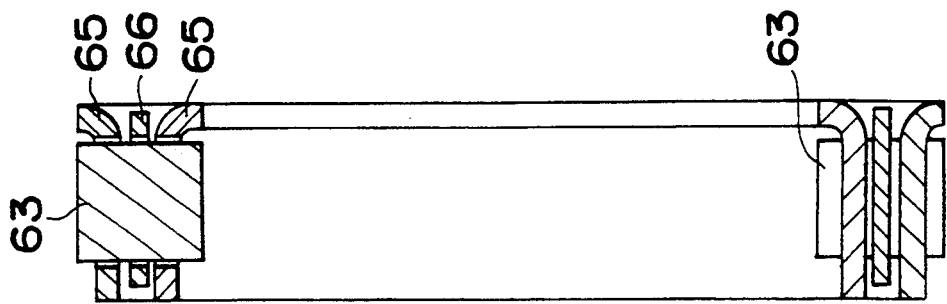
FIG. 1B is a cross-sectional view taken along line 1–1 of FIG. 1A.
Figure 1A:
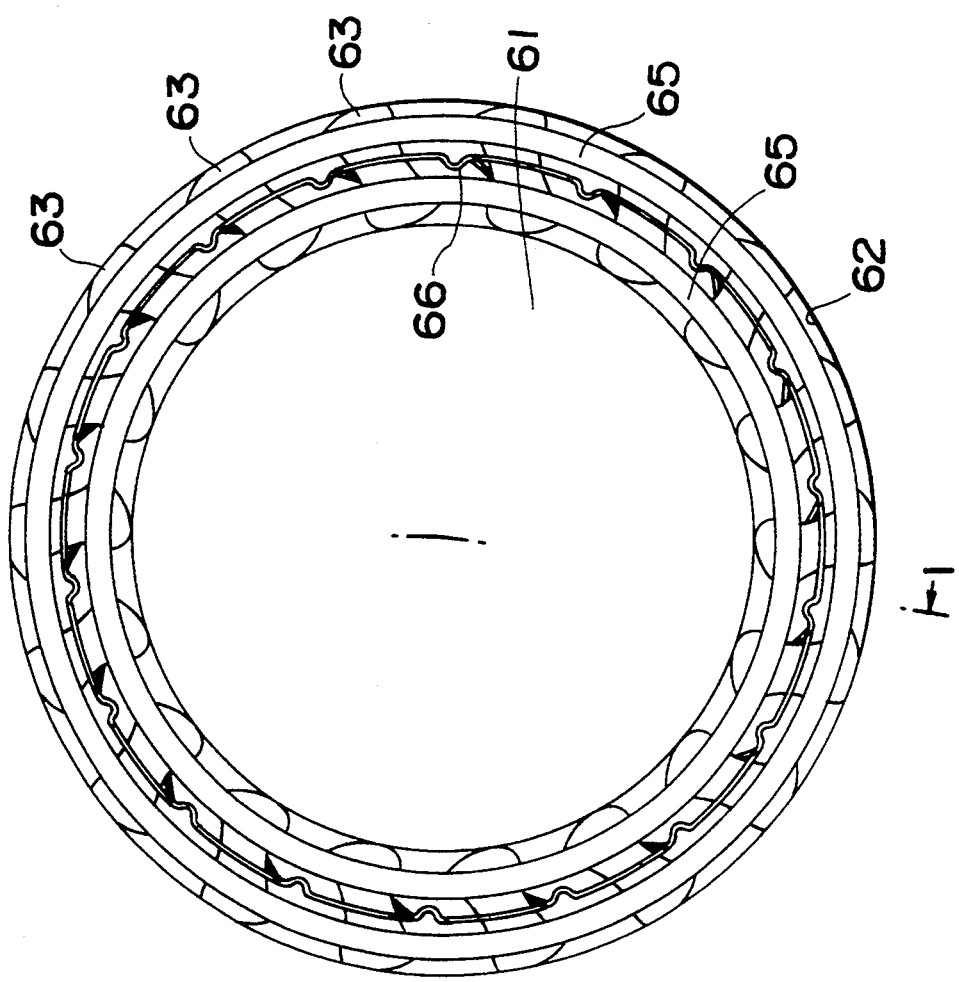
FIG. 1A is a side view of a con, on one-way clutch.
Figure 2:
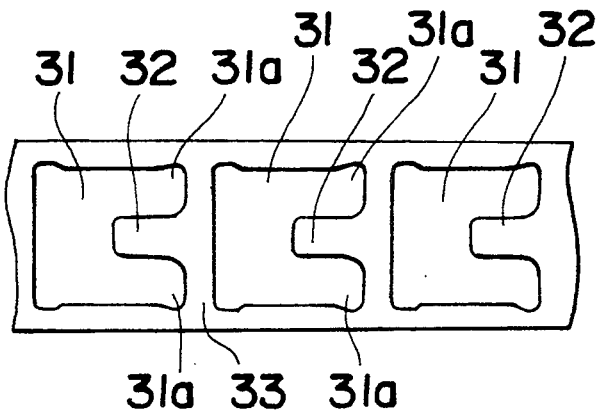
FIGS. 2-4 are fragmentary plan views of conventional annular springs for use in a one-way clutch as shown in FIG. 1A.
Figure 3:
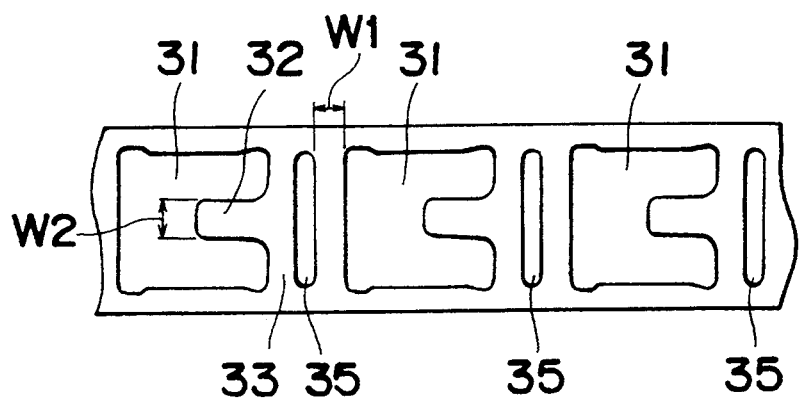
Figure 4:
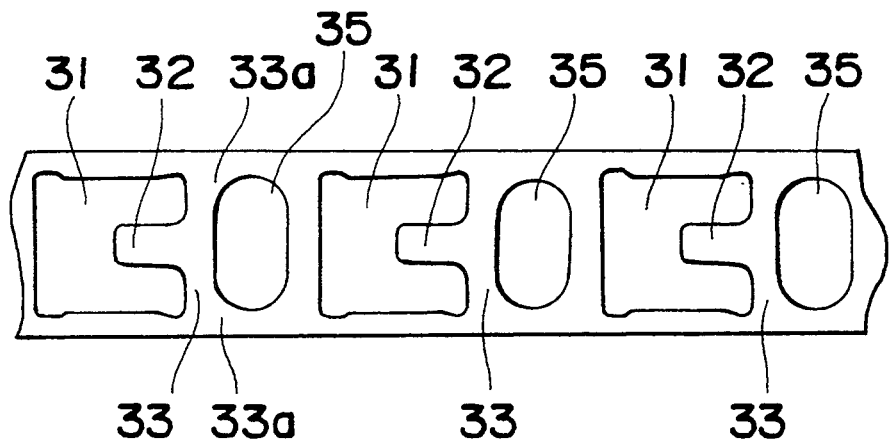

Due to the fillets 5a of each opening 5 being shaped so as to lengthen the edge 51 in the crosswise direction of the spring and to expand the corners of the opening 5 toward the end portions 3a of the corresponding transverse section 3, the end portions 3a of the transverse section 3 are prevented from being wider than the tab 2. That is, the widths of the end portions 3a are controlled to be equal to or even narrower than that of the tab 2, unlike the prior art having an elliptic adjusting opening 35 as shown in FIGS. 3 and 4. With this arrangement, stress exerted from the engagement members (63 in FIGS. 1A and 1B) on the tabs 2 can be absorbed by the elastic torsional deformation of the transverse sections 3, so that the stress concentration on the tabs 2 and the resulting breakage of the tabs 2 are thereby prevented.

Furthermore, since each receiving opening 1 also has the fillets 1a protruding outwardly toward the end portions 3a of the corresponding transverse section 3, the end portions 3a can be reduced in width from both the adjusting opening 5 and the receiving opening 1. Therefore, the width of the transverse sections 3 can be adjusted very easily and to a great extent. Thus, the stress exerted on the tabs 2 is absorbed very well by the transverse sections 3 having non-wide end portions and the stress concentration on the tabs 2 is almost perfectly prevented.

Furthermore, due to the curved quasi-triangular shape of the fillets 5a, 5b of the adjusting opening 5 which protrude outward in the crosswise direction to the end portions 3a of the transverse sections 3, the radius of curvature of the fillets 5a, 5b is reduced, as compared with that of the corners of the elliptic openings 35 of the prior art spring shown in FIG. 4, where the widths of the adjusting openings 5 and 35 are the same. Accordingly, less burr is generated at the time of punching the adjusting openings 5, as compared with the prior art spring.

The end portions of the other transverse sections (second transverse sections) 3 without the tabs 2 are also designed so as to not be widened, due to the presence of the fillets 1b and 5b.

The shapes of the fillets 1a and 1b of the receiving openings 1 and of the fillets 5a and 5b are not limited to those of the above embodiment shown in FIG. 5, but can be varied as shown in FIGS. 7-11.

Figure 7:
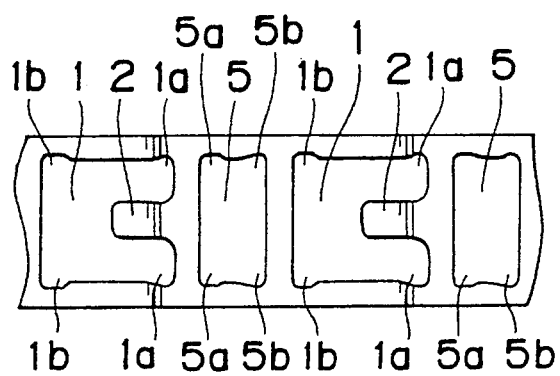
FIG. 7-11 are fragmentary plan views of variants of the annular spring of the present invention.

In a variant shown in FIG. 7, the fillets 1a and 1b of each receiving opening 1 have a curved quasi-triangular shape and a curved quasi-trapezoidal shape, respectively, while the fillets 5a and 5b of each adjusting opening 5 have a curved quasi-trapezoidal shape and a curved quasi-triangular shape respectively.

Figure 8:
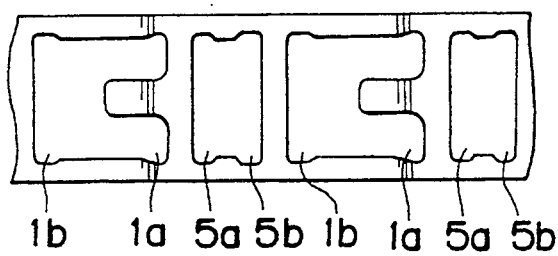

In another variant shown in FIG. 8, the fillets 1a and 1b of each receiving opening 1 have a curved quasi-triangular shape and a curved quasi-trapezoidal shape, respectively, while all the fillets 5a and 5b of each adjusting opening 5 have a curved quasi-trapezoidal shape.

Figure 9:
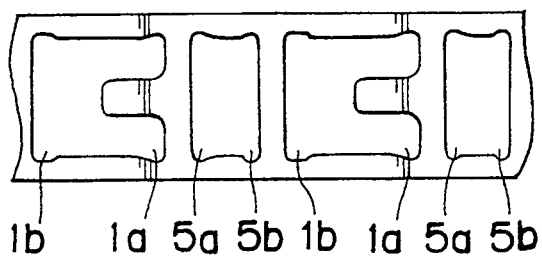

In a still another variant shown in FIG. 9, the fillets 1a and 1b of each receiving opening 1 have a curved quasi-triangular shape and a curved quasi-trapezoidal shape, while the fillets 5a and 5b of each adjusting opening 5 have a curved quasi-triangular shape and a semicircular shape.

Figure 10:
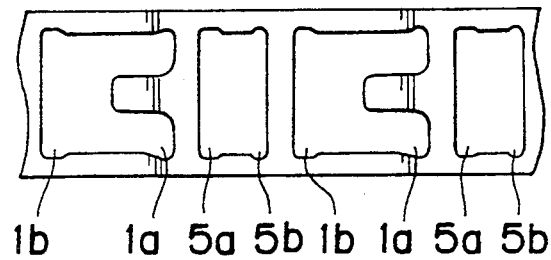

In a further variant shown in FIG. 10, the fillets 1a and 1b of each receiving opening 1 have a curved quasi-triangular shape and a curved quasi-trapezoidal shape, while the fillets 5a and 5b of each adjusting opening 5 have a curved quasi-trapezoidal shape and a semicircular shape.

Figure 11:
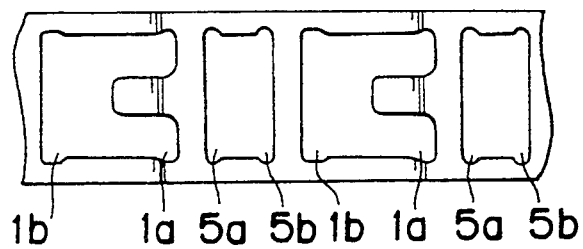

In a variant shown in FIG. 11, the fillets 1a and 1b of the receiving opening 1 have a curved quasi-triangular shape and a curved quasi-trapezoidal shape, while all the fillets 5a and 5b of the adjusting opening 5 have a semicircular shape.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An elongated spring for a one-way clutch, said spring being adapted to be assembled in an annular shape into the one-way clutch to urge engagement members disposed between inner and outer races of the one-way clutch in one direction, said elongated spring comprising:

first and second transverse sections extending transverse relative to a longitudinal direction of said elongated spring, said first and second transverse sections being alternately provided;

receiving openings defined between said first and second transverse sections and having a generally rectangular shape adapted to receive the engagement members therein;

tabs adapted to urge the engagement members in the one direction, said tabs being integral with said first transverse sections and projecting into respective ones of said receiving openings; and adjusting openings defined between said first and second transverse sections and provided alternately with said receiving openings, wherein each adjusting opening is of a generally rectangular shape and is provided with curved fillets protruding outwardly in a direction transverse to the longitudinal direction of said elongated spring.

2. The spring of claim 1, wherein each first transverse section has a substantially uniform width, along the longitudinal direction of said elongated spring, from one end thereof to the other end thereof, said width of the first transverse section being not larger than a width of each tab along a direction transverse to the longitudinal direction of said elongated spring.

3. The spring of claim 1, wherein each receiving opening is provided with fillets which protrude outwardly in a direction transverse to the longitudinal direction of said elongated spring.

4. The spring of claim 3, wherein each first transverse section has a substantially uniform width, along the longitudinal direction of said elongated spring, from one end thereof to the other end thereof, said width of the first transverse section being not larger than a width of each tab along the direction transverse to the longitudinal direction of said elongated spring.

5. The spring of claim 1, wherein said adjusting openings constitute a means for allowing said receiving openings to be spaced apart by a required distance while limiting widths, along the longitudinal direction of said elongated spring, of at least said first transverse sections.

* * * * *